Patented Apr. 23, 1935

1,998,795

UNITED STATES PATENT OFFICE 1,998,795

PROCESS FOR RECOVERING 4-NITRO-2-AMINO-TOLUENE FROM ITS NITRATION MIXTURE

John M. Tinker, South Milwaukee, Wis., and Willard C. Stewart, Preston, Iowa, assignors to E. I. du Pont de Nemours & Company, Wilmington, Del., a corporation of Delaware No Drawing. Application February 5, 1932, Serial No. 591,240

10 Claims. (Cl. 260—130.5)

This invention relates to a process for purifying p-nitro-o-toluidine ($CH_3:NH_2:NO_2=1:2:4$). It is an object of this invention to provide an economical and efficient process for separating p-nitro-o-toluidine from isomers or other nitro bodies formed therewith in the nitration of o-toluidine by reacting upon the same with nitric acid in a medium of sulfuric acid.

Other and further important objects of this invention will appear as the description proceeds.

By p-nitro-o-toluidine we are referring herein to the following compound:

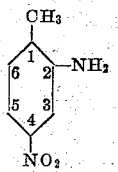

This compound, which may also be designated 4-nitro-2-amino-toluene or 4-nitro-2-toluidine, is a valuable intermediate for dyestuffs. It is generally prepared in the art by reacting with a nitric-sulfuric-acid mixture upon o-toluidine in a medium of concentrated sulfuric acid (Beilstein, 4th Ed., XII, 844). This process leads to a product consisting mainly of 4-nitro-2-toluidine, but containing also some quantities of 6-nitro-2-toluidine and small amounts of the 5-nitro-isomer. The method used in the art for separating these was based on the different solubilities of their sulfates. The sulfate of the 4-isomer is considerably less soluble in cold dilute sulfuric acid than that of the 6-isomer. Separation was therefore effected by fractional precipitation of the sulfates from the cooled and diluted sulfuric acid solution in which they are formed, and further recrystallization from alcohol (ibid).

This method, however, has the disadvantage that large quantities of the 4-isomer are lost due to its residual solubility in the mother liquors. In other words, whatever amounts of 4-nitro-2-toluidine sulfate are precipitated are substantially free of isomers, but not all the 4-nitro-2-toluidine in the original solution is so precipitated. The process is, therefore, wasteful of the desired main product.

We have now found that the 4-nitro isomer formed in the above process of nitration can be very effectively and economically precipitated out of the nitration mass by conversion into a salt of an aryl sulfonic acid. It appears that aryl sulfonates of 4-nitro-2-toluidine are considerably less soluble than the corresponding sulfonates of the other isomers, and also less soluble than the sulfate of 4-nitro-2-toluidine. As a result, both the precipitation of 4-nitro-2-toluidine from the nitration mass is more complete than, and its separation from the other isomers is at least as good as in the case of precipitation by the shulfate method.

Many and various aryl sulfonic acids may be used for our purpose, including those of the benzene, naphthalene and anthraquinone series. For practical purposes, however, the sulfonic acids of naphthalene are most advantageous, since these can be obtained readily and more economically than the others. It is not necessary for our purpose to use chemically isolated sulfonic acids of naphthalene. Since either $\alpha$- or $\beta$-naphthalene sulfonic acid or various disulfonic acids of naphthalene are effective for our purpose, it is more economical to use the sulfonation mass directly as obtained in sulfonating naphthalene.

The above results were not to be foreseen since there appears to be no rule by which to predict the solubilities of a given aryl-sulfonate of various aromatic amines. Nor was it to be foreseen that the various naphthalene sulfonates of 4-nitro-2-toluidine and 6-nitro-2-toluidine will divide as respects their solubilities along the same line as any particular naphthalene sulfonate of the two amines, with the resultant advantage that a mixture of naphthalene sulfonates may be used to effect separation instead of a particular single sulfonate.

It has been known in the art to form arylamine salts of various naphthalene-sulfonic acids to effect separation of the latter from each other (Jour. Soc. Chem. Ind., Vol. 43, pages 299–303T). This implied that the salts of a given arylamine and two different naphthalene sulfonic acids differed in their solubilities sufficiently to effect separation of the two. The reverse, however, was not to be foreseen. Namely, it was not to be foreseen that the salts formed by a given naphthalene sulfonic acid and two isomeric arylamines, more particularly, the 4- and 6-nitro-2-toluidines, would differ sufficiently in their solubilities to enable separation.

The reaction between the mixture of nitro-toluidines and the naphthalene sulfonic acids may be effected in any convenient manner, for instance by diluting the respective reaction masses, that is, the nitration mass of toluidine and the sulfonation mass of naphthalene, without troubling to isolate the solid products.

If desired, a water soluble salt of the aryl-sulfonic acid may be used in lieu of the free acid; again, a mixture of the two may be employed.

After the precipitated aryl-sulfonate of p-nitro-o-toluidine has been isolated, it may be neutralized with alkali (such as caustic alkali, sodium carbonate, or ammonia) to give the free base of p-nitro-o-toluidine and the corresponding salt of the aryl-sulfonic acid. The former is insoluble in the neutralized mass and may be recovered by filtration, while the mother liquors may be reused for precipitating p-nitro-o-toluidine from a subsequent nitration batch.

Without limiting our invention to any particular procedure, the following example is given to illustrate our preferred mode of operation. Parts given are parts by weight.

Example

A finished nitration mass as obtained from 214 parts of o-toluidine, and containing about 1000 parts of concentrated sulfuric acid is poured into 4000 parts of cold water. The temperature may be allowed to rise to 45-50° C. A solution of naphthalene 1,5- and 1,6-disulfonic acid as obtained by sulfonating 140 parts of naphthalene with 25% oleum at 20-40° C. and diluting the finished sulfonation with water, is now added. The entire mass is diluted with water to a total of about 10,000 parts. It is then stirred for 12-15 hours at room temperature and filtered. The filter cake is washed well with 7500 parts of cold water.

The washed salt is stirred with a hot solution of 130 parts of soda ash in 5000 parts of water at about 45-50° C. It is then cooled to room temperature, filtered and washed. The filter cake is dried at 75-80° C., and yields 234 parts of 4-nitro-2-amino-toluene in the form of a light yellow powder, melting at 106.6-107.0° C. The recovery thus amounts to substantially 90-95% of all the p-isomer formed in this nitration process.

The recovered mother liquor contains the sodium salt of naphthalene-disulfonic acid and may be used instead of the free acid for precipitation of 4-nitro-2-toluidine in the next nitration batch. For best results, it is preferably fortified with a quantity of fresh naphthalene-disulfonic acid, or a water-soluble salt thereof, corresponding to 43 parts of naphthalene.

If desired, naphthalene-monosulfonic acid ($\alpha$, $\beta$, or a mixture of the two) may be used for precipitation instead of the disulfonic acid. In this case a quantity of monosulfonic acid (or a salt thereof) corresponding to 198 parts of naphthalene are needed for the first batch, and a quantity corresponding to 47 parts of naphthalene should preferably be used in addition to the basic mother liquor from the previous hydrolysis step, in each subsequent batch.

In general, the quantity of aryl-sulfonic acid body to be added can be determined stoichiometrically from an analyzed sample of the nitration mass. A simpler method, however, is to add aryl sulfonate to the nitration mass until a small sample thereof, filtered at room temperature, gives no further precipitate with additional aryl-sulfonic acid. Excessive quantities of aryl-sulfonic acid have no harmful effects on the process except that they constitute waste.

The temperature of the mass during the first filtration step should preferably be about room temperature or lower, to prevent solution of undue amounts of the 4-nitro-2-toluidine-aryl-sulfonate in the mother liquor. However, considerable variation is permissible either way, as long as a test does not show the mother liquors to contain more than about 18 to 20% of the total quantity of nitro-toluidines formed. Similarly, excessive washing of the filter cake may carry off some of the desired product. The washing should therefore not be carried beyond the point at which a sample of the filter cake, when based, refiltered and dried, has a melting point of 106.6-107.0° C.

Many variations and modifications are possible in our preferred mode of procedure without departing from the spirit of this invention.

In the claims below it should be understood that by the term "sulfonic acid body" we intend to cover the isolated sulfonic acid, salts thereof, and the crude sulfonation mass in which these may be produced.

We claim:

1. In the process of preparing 4-nitro-2-amino-toluene by nitrating o-toluidine in concentrated sulfuric acid, the step which comprises reacting the diluted nitration mass with an aryl-sulfonic acid body.

2. In the process of preparing 4-nitro-2-amino-toluene by nitrating o-toluidine in concentrated sulfuric acid, the step which comprises reacting the diluted nitration mass with a water soluble aryl-sulfonic acid body, and recovering the precipitated mass.

3. A process as in claim 2, in which the aryl-sulfonic acid body is a mixture of naphthalene sulfonic acids and their water-soluble salts.

4. A process as in claim 2, in which the aryl-sulfonic acid body is a mixture of naphthalene sulfonic acids.

5. In the process of preparing 4-nitro-2-amino-toluene by nitrating o-toluidine in concentrated sulfuric acid, the steps which comprise reacting the diluted nitration mass with an water soluble aryl-sulfonic acid body, filtering off the precipitated aryl-sulfonate of 4-nitro-2-amino-toluene and hydrolyzing the same in alkaline solution to recover 4-nitro-2-amino-toluene.

6. A process for preparing 4-nitro-2-amino-toluene in a form substantially free of isomers, which comprises mono-nitrating o-toluidine in concentrated sulfuric acid, diluting the reaction mass with water, adding an aqueous solution of aryl sulfonic acid compounds, filtering, reacting upon the filter cake with hot aqueous alkali, cooling and recovering the precipitated 4-nitro-2-amino-toluene.

7. A process for preparing 4-nitro-2-amino-toluene in a form substantially free of isomers, which comprises mono-nitrating o-toluidine in concentrated sulfuric acid, diluting the reaction mass with water, adding an aqueous solution of naphthalene sulfonic acid compounds, filtering, reacting upon the filter cake with hot aqueous alkali, cooling and recovering the precipitated 4-nitro-2-amino-toluene.

8. In the process of preparing 4-nitro-2-amino-toluene by nitrating o-toluidine in concentrated sulfuric acid, the steps which comprise reacting the diluted nitration mass with a water-soluble aryl-sulfonic acid body, filtering off the precipitated aryl-sulfonate of 4-nitro-2-amino-toluene and reacting upon the latter with alkali to recover 4-nitro-2-amino-toluene.

9. In the process of preparing 4-nitro-2-amino-toluene by nitrating o-toluidine in concentrated sulfuric acid, the step which comprises reacting the diluted nitration mass with a water soluble aryl-sulfonic acid body.

10. In the process of preparing 4-nitro-2-amino-toluene by nitrating o-toluidine in concentrated sulfuric acid, the step which comprises reacting the diluted nitration mass with a water soluble aryl-sulfonic acid body selected from the benzene, naphthalene and anthraquinone series.

JOHN M. TINKER.
WILLARD C. STEWART.